United States Patent [19]

Helke

[11] 4,237,004
[45] Dec. 2, 1980

[54] METHOD FOR TREATING WASTE WATER

[75] Inventor: Robert C. Helke, Walworth, Wis.

[73] Assignee: Le Mere Industries, Inc., Walworth, Wis.

[21] Appl. No.: 947,655

[22] Filed: Oct. 2, 1978

[51] Int. Cl.³ .............................................. C02F 1/24
[52] U.S. Cl. ... 210/704; 210/221.2; 210/764; 210/765 210/221 P
[58] Field of Search ........... 210/44, 62, 221 M, 221 P, 210/49, 50, 53, 40

[56] References Cited

U.S. PATENT DOCUMENTS

| | | | |
|---|---|---|---|
| 3,642,617 | 2/1972 | Brink et al. | 210/22 M |
| 3,959,131 | 5/1976 | Ramirez et al. | 210/44 |
| 3,966,598 | 6/1976 | Ettelt | 210/44 |
| 4,092,242 | 5/1978 | Deane | 210/44 X |
| 4,108,768 | 8/1978 | Sebelik et al. | 210/44 X |
| 4,124,499 | 11/1978 | Hobbs et al. | 210/62 X |

*Primary Examiner*—Thomas G. Wyse
*Attorney, Agent, or Firm*—Mason, Kolehmainen, Rathburn & Wyss

[57] ABSTRACT

A method useful for treating waste water is disclosed wherein waste water is collected in a first vessel and a portion of the large solid particles are filtered from said waste waters. The liquid waste including suspended solid particles is combined with a solids coagulant, effective in coagulating solid particles, and the waste is disinfected. In one embodiment, coagulation and disinfection occurs simultaneously in a single treatment vessel. In the treatment vessel, the disinfectant and the coagulant are reacted with the waste waters to form gas bubbles and coagulated solid particles. The reaction of the disinfectant causes a substantial portion of the coagulated solids contained in the treatment vessel to float to the upper portion of the treatment vessel as a result of being carried to the surface by the gas bubbles. The clarified waste water is then removed from an outer chamber in the treatment vessel. In another embodiment, waste water is disinfected by radiation so that gas bubbles are not formed by the disinfection reaction. In this embodiment the coagulated solids are floated to the surface of the treatment vessel by providing small gas, i.e. air, bubbles in the treatment vessel generated from an extraneous source.

12 Claims, 6 Drawing Figures

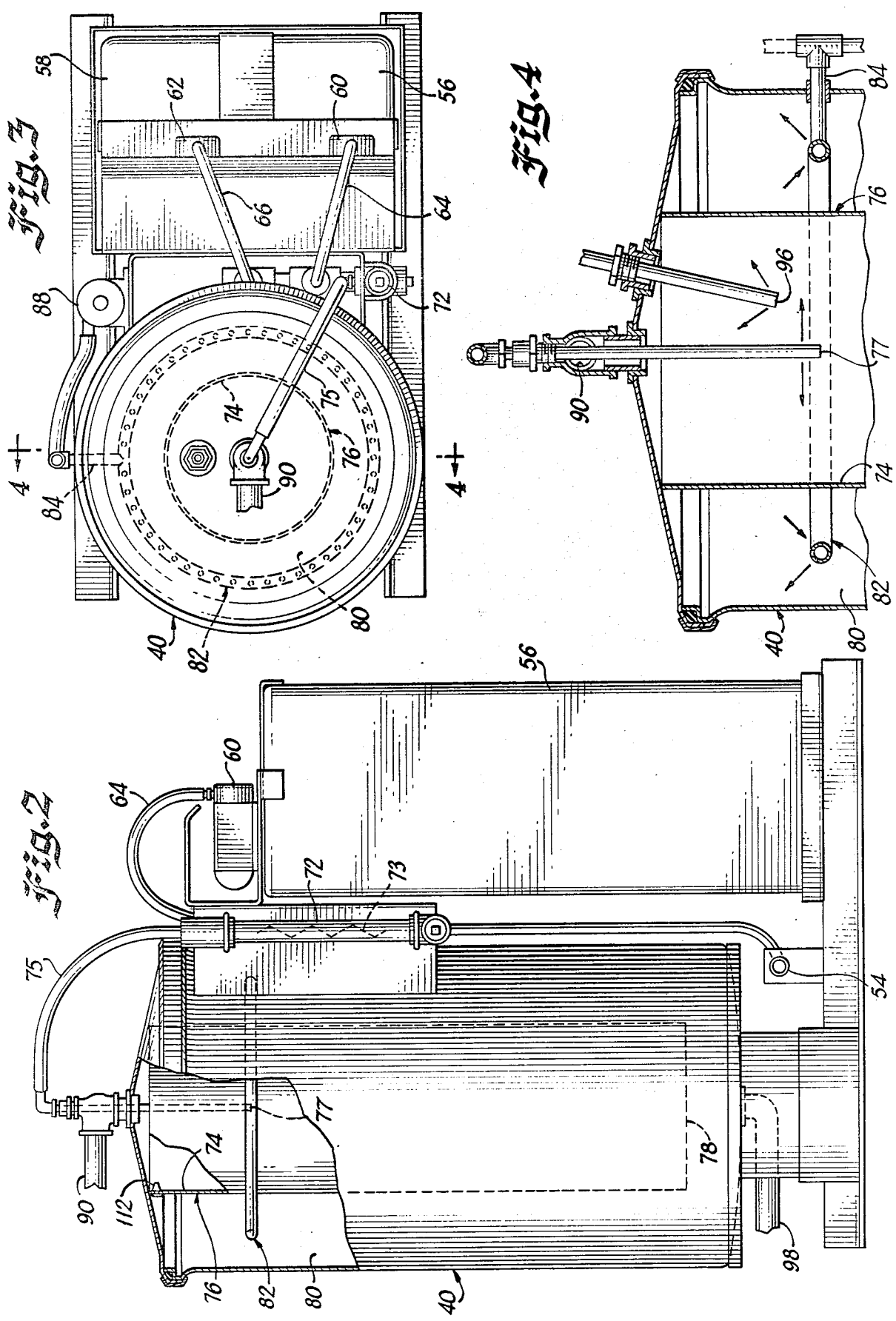

METHOD FOR TREATING WASTE WATER

FIELD OF THE INVENTION

The present invention relates to a method and apparatus for treating waste water and, in particular, for use in the marine industry to treat raw waste and other marine waste waters in a relatively small, self-contained, modular disposal unit.

BACKGROUND OF THE INVENTION AND PRIOR ART

Relatively small, self contained, modular waste water treatment devices have been used in the marine industry to avoid discharge at sea of contaminated waste waters and to eliminate the need to store waste waters on board. Such prior art waste water treatment devices meet the Coast Guard standards for overflow discharge of treated effluent. One requirement for marine waste water treatment units is that they should be small enough to be moved easily through vessel doors and to occupy a minimum amount of vessel space. The unit also should have the capability, via modular constitution, of being installed at sea to avoid costly vessel tie up time.

A typical marine industry waste water treatment device presently used is described in U.S. Pat. No. 3,638,590. In accordance with such typical prior art devices, the waste water is collected in a first vessel for separation of non-colloidal solid wastes and the separated solid wastes are comminuted to a maximum particle size of about ¼ inch. The waste water, including the comminuted solid wastes then are tranferred to a second vessel for coagulation by contact with a suitable high molecular weight polyelectrolyte and the coagulated solid wastes are removed from the liquid wastes in a separate device, such as a centrifuge. The liquid wastes then are directed to a third vessel for disinfection by contact with a suitable chemical, such as sodium hypochlorite. The disinfected liquid wastes may be further purified by absorption of the dissolved organics in a fourth vessel by contact with a suitable absorbant, such as activated charcoal. Other, similar marine sanitation units have been developed which utilize the above-described process steps without the need for solids comminution. One such unit is the SANI-SYSTEM 600 TYPE I device manufactured by CLEAR WATER, INC. Subsidiary of La Mere Industries, Inc., Walworth, Wisconsin, described in Form No. 597169-77.

In each of these prior art sanitation units it has been necessary to use separate vessels for the ordered process steps of solids coagulation, separation, and disinfection. In accordance with the present invention, it has been found that these three process steps can be carried out effectively in a single treatment vessel of particular construction by contacting the waste water with coagulant and disinfectant on route to the treatment vessel.

SUMMARY OF THE INVENTION

An object of the present invention is to provide a method for treating waste water wherein the steps of coagulation or flocculation, solids separation, and disinfection are carried out in a single multicompartmental vessel.

Another object of the present invention is to provide a method for treating waste water wherein chemical treatment of the waste water is confined to a single vessel.

Another object of the present invention is to provide a method for treating waste water wherein a floating solids layer in a chemical treatment vessel acts as a filter to further purify liquid wastes and to aid in separating liquid from solid wastes.

Another object of the present invention is to provide a method for treating waste water wherein three separate waste water flow rates are used to provide effective coagulation and disinfection. The first flow rate being turbulent flow to establish intimate contact of the waste water with the disinfectant and/or coagulant chemicals. The second flow rate being non-turbulent in an inner contact chamber of a treatment vessel to provide a major amount of coagulation and solids separation; and the third flow rate being less than the first two flow rates, in an outer contact chamber of the treatment vessel to provide final solids coagulation, separation, and disinfection.

Another object of the present invention is to provide a method for treating waste water wherein disinfection of the waste water causes liberation of $CO_2$ gas which attach to solid particles contained within the waste water to lift the solid particles to an upper portion of a treatment vessel, used for both coagulation and disinfection, for separation of solids from liquid wastes.

Another object of the present invention is to provide a waste water treatment vessel having an inner chamber and an outer chamber in fluid communication therewith wherein waste water, coagulant, and disinfectant are introduced into the treatment vessel at an upper portion of the inner chamber and proceed downwardly through the inner chamber and then upwardly into the outer chamber.

Another object of the present invention is to provide a waste water treatment vessel having an inner chamber and an outer chamber in fluid communication therewith wherein waste water, and coagulant are introduced into the treatment vessel at an upper portion of the inner chamber and proceed downwardly through the inner chamber and then upwardly into the outer chamber.

In brief, the above and other objects and advantages of the present invention are accomplished by providing a chemical treatment vessel of particular construction and directing waste water into the chemical treatment vessel for coagulation, separation and disinfection in a single vessel. In another embodiment, the waste water can be disinfected with radiation before reaching the treatment vessel or within the treatment vessel and the solids coagulated within the vessel can be floated to the surface with small gas, i.e. air, bubbles. Only two major vessels are required—a collection vessel and a treatment vessel. The chemical treatment vessel includes an annular central chamber concentrically disposed within an outer annular chamber. Waste water is fed into an upper end of the annular central chamber which provides a primary storage volume for retained solids.

In accordance with an important feature of one embodiment of the present invention, the waste water is contacted with both a coagulant and a chlorine containing disinfectant while the waste water is being conveyed on route to the central contact chamber of the treatment vessel. The disinfectant liberates $CO_2$ on contact with the BOD contained within the waste water and the $CO_2$ bubbles attach to the coagulated solids to lift a major portion of the coagulated solids to a top portion of the central chamber and thereby separate the coagulated solids from the liquid wastes. These lifted solids act as a primary filter for the incoming waste water and build downwardly in the central chamber until it is necessary to drain and flush the solids from the treatment vessel.

To achieve the full advantage of the present invention, the waste water contacted with the coagulant and, in one embodiment, also with the disinfectant, is conveyed through a static mixer to disperse the coagulant and disinfectant throughout the waste water prior to entering the treatment vessel. The static mixer comprises a vessel containing tortuous travel paths disposed in the waste water conduit on route to the treatment vessel. The static mixer provides sufficient coagulant-disinfectant-waste water contact by creating turbulent flow to form a homogeneous liquid-solids waste water entering the treatment vessel to assure the formation of a continuous spongy mass of coagulated solids across the entire top surface of the central chamber. The spongy mass of solids provides additional filtration of the waste water entering the treatment vessel.

The waste water proceeds downwardly through the central contact chamber and flows into an outer, elongated, coaxial, concentric, toroid shaped volume surrounding the central chamber. This outer, surrounding, coaxial, toroidal treatment vessel volume extends the retention time of the waste water within the treatment vessel for further coagulation and disinfection. Any floatable coagulated solids proceeding from the central contact chamber into the surrounding toroidal volume of the treatment vessel collect as a scum layer at the top of the toroidal or outer chamber at a location above an effluent discharge conduit. The overboard effluent discharge conduit in the treatment vessel includes effluent dicharge holes disposed on its upper surface to prevent rising solids from entering the discharge conduit. The treatment vessel is operated completely full under a standing head of water to insure that vessel roll or pitch will not cause separated solids to remix with the waste water.

BRIEF DESCRIPTION OF THE DRAWING

FIG. 2 is a partially cut-away, elevated, side view of the treatment vessel constructed in accordance with the principles of the present invention.

FIG. 3 is a top view of the treatment vessel of FIG. 2.

FIG. 4 is an enlarged, broken away, cross-sectional view of the treatment vessel taken along the line 4—4 of FIG. 3.

DETAILED DESCRIPTION OF A PREFERRED EMBODIMENT

Figure 1:
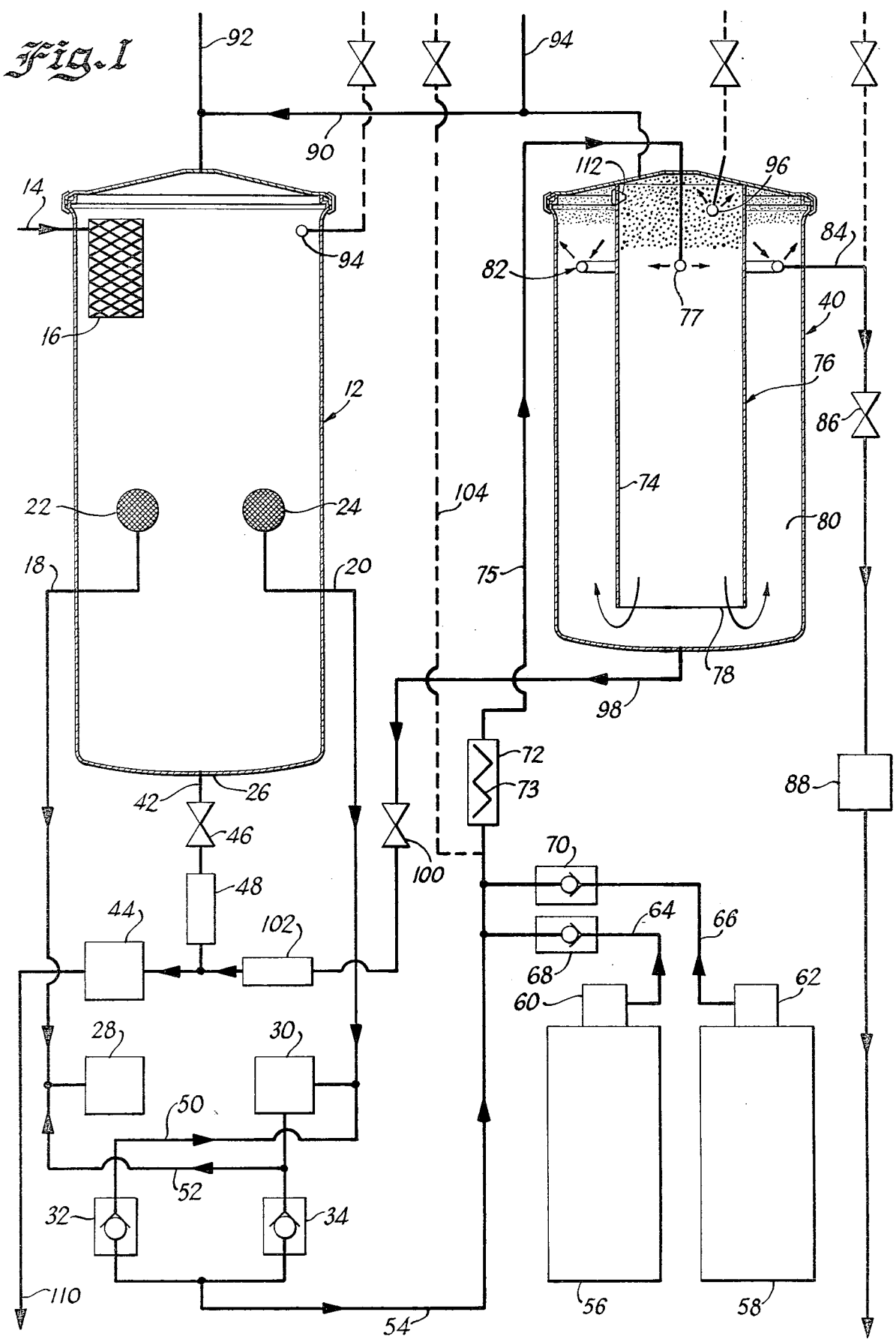
FIG. 1 is a schematic view of the new and improved waste water treatment method and apparatus of the present invention.

Referring now to the drawings, and initially to the schematic flow diagram of FIG. 1, there is schematically illustrated a method and apparatus for treating waste waters in accordance with the present invention. The schematic view of FIG. 1. shows a preferred embodiment wherein a chlorine-containing disinfectant is added to the waste water on route to a treatment vessel.

Sewage enters collection vessel 12 through conduit 14 and initially passes through a gross solids separator 16 comprising a filter, such as a stainless steel screen, capable of collecting solid objects having a spherical diameter of, for example, $\frac{3}{4}$ inch or greater. Two outlet conduits 18 and 20 are disposed near the bottom portion of the collection vessel 12 and are connected to filters 22 and 24 disposed within collection vessel 12, and, in a preferred embodiment, have a screen size of about 200 microns. Accordingly, solids within the range of 200 microns to about $\frac{3}{4}$ inch in spherical diameter will collect at a bottom 26 of collection vessel 12. Filtered sewage, including solid particles able to pass through filters 22 and 24, are directed out of collection vessel 12 through conduit 18 or 20. Solid particles unable to pass through filters 22 and 24 will eventually settle in a solids storage volume or lowermost portion of collection vessel 12 while smaller size particles remain in suspension above the solids storage volume.

To achieve the full advantage of the present invention, the filters 22 and 24 are disposed approximately about $\frac{1}{4}$ to $\frac{1}{2}$ of the collection vessel 12 height above the bottom 26 of collection vessel 12 to provide a suitable storage volume for unsuspended solids below the filters 22 and 24. Directly above the filters 22 and 24 is a central portion of collection vessel 12 comprising a process volume, and directly above the center portion of collection vessel 12 is a surge and storage volume disposed directly beneath gross solid separator 16. A top portion of collection vessel 12 can be generally designated as a ullage volume. The twice filtered waste water containing suspended solids is directed out of collection vessel 12 through conduit 18 or 20 by a pump 28 or 30, through check valve 32 or 34 into the treatment vessel 40. The process pumps 28 and 30 alternate approximately once every 90 seconds to permit the filters 22 and 24 to be backwashed by alternately operating pumps 28 and 30 through backwash lines 50 and 52, respectively. Pump 28 backwashes filter 24 by directing filtered waste water through backwash line 50 and upwardly through discharge conduit 20 into filter 24. Similarly, pump 30 is used to backwash filter 22 by pumping filtered waste water through backwash line 52 upwardly through discharge conduit 18 into filter 22. The process pumps 28 and 30 alternate to accomplish filtered backwashing. The largest portion of pump volume, approximately 14 gallons per minute, is used to backwash the filters while an orifice controlled amount, approximately 3 times the average flow, is piped to the treatment vessel 40. In a preferred embodiment, the two process pumps 28 and 30 are single stage centrifugal bronze pumps driven by $\frac{1}{2}$ horsepower motors operating at approximately 10 psig. Both pumps are capable of pumping solids with a spherical diameter up to about 500 microns. Conduit 42 is interconnected to the lowermost point of the bottom 26 of collection vessel 12 for solids discharge. Solids up to $\frac{3}{4}$ inch in diameter from collection vessel 12 are directed through conduit 42 by solids pump 44 through valve 46 and siteglass 48 and are disposed of onshore as an overboard discharge.

The filtered waste water proceeds along conduit 54 where it is mixed with flocculant or coagulant contained within flocculant storage vessel 56 and where, in accordance with one embodiment of the present invention, it is mixed with a disinfectant contained within disinfectant storage vessel 58 by pumping flocculant, via flocculant pump 60, and by pumping disinfectant, via disinfectant pump 62, through conduits 64 and 66, respectively, through check valves 68 and 70. The waste water, containing dispersed and partially coagulated solids, proceeds through static mixer 72. In this static mixer 72, the filtered waste water, coagulant, and disinfectant are vigorously comingled by creation of turbulent flow within the mixer 72. The mixture is discharged from static mixer 72 through conduit 75 as a homogenous, solids-liquid mixture and enters a central portion of the treatment vessel 40 where it is sprayed through nozzle 77 toward the inner walls 74 of a central contact compartment or internal chamber, generally designated 76.

The simultaneous coagulation and disinfection combine to cause both suspended and dissolved solids to form in a spongy mass within the top portion of the central contact compartment 76. In accordance with an important feature of the present invention, three mixing velocities are utilized to cause clarification and disinfection of waste water. The sewage and chemicals are combined in the static mixer under turbulent flow. The mixture then enters the central contact compartment 76 where the liquid velocity drops abruptly. The chlorine provides an oxidant which acts upon the sewage and combines with the carbonaceous material to form, among other products, carbon dioxide which provides buoyancy to the solid particles. These particles are accumulated by the coagulant to form the retained spongy mass within the upper end of contact chamber 76. The partially clarified liquid continues downwardly in the contact chamber 76 and passes through an open transition volume area below the lowermost toroidal wall and 78 of the contact chamber 76. This open bottom contact cylinder 76 acts as an inverted weir to keep the larger, first flocculated solids within the center volume of contact chamber 76. The liquid velocity drops again in an outer toroidal volume within toroidal retention chamber 80 of treatment vessel 40 since the torroidal retention chamber 80 is larger than the central contact chamber 76. In this toroidal retention chamber 80, the smaller suspended particles flocculate and additional dissolved solids (BOD or nutrients) are removed. It is evident that the smaller sized particles are removed in the final toroidal volume as seen in the increased density or compaction of the sludge or scum removed from the upper end of the toroidal retention chamber 80.

In accordance with another embodiment of the present invention, the waste water can be disinfected at any point in the flow diagram, before or after solids removal, without using chlorine as a disinfectant, for example, by subjecting the waste water to ultra violet (UV) radiation. In accordance with this embodiment, tiny bubbles of gas, such as air, can be bubbled upwardly from the bottom of inner chamber 76 of the treatment vessel 40 to provide floatation to coagulated solids in the treatment vessel 40. If needed, additional microbubbles can be provided in the outer chamber 80. Floatation by microbubble diffusion and UV disinfection are both well known processes and need not be disclosed herein in detail.

An annular, ring-shaped, treated effluent gathering device 82 is disposed within the upper-central portion of treatment vessel 40 to remove treated effluent from the toroidal outer chamber 80. The treated effluent discharge device 82 includes effluent intake openings on its upper surface so that rising solids will not be entrained within these openings. The treated effluent from effluent collection device 82 proceeds along conduit 84 through valve 86 via pump 88 where it can be lawfully discharged overboard.

The collection vessel 12 and treatment vessel 40 are maintained full by providing a constant head of liquid above each of these vessels in conduit 90, interconnecting the two vessels 12 and 40 at their uppermost points. Vents 92 and 94 are provided in conduit 90 to assure that the collection vessel 12 and treatment vessel 40 are maintained full thereby preventing air pockets and air bubbles from forming in these vessels. Collection vessel 12 is provided with a rinse nozzle 94 and treatment vessel 40 is provided with a rinse nozzle 96 to remove solids from each vessel during shutdown. Similarly, the static mixer 72 can be rinsed by providing rinse water through conduit 104. Rinse lines in FIG. 1 are shown in dashed lines. Solids rinsed from treatment vessel 40 proceed to the bottom of treatment vessel 40, along conduit 98, through discharge valve 100, and through siteglass 102, via solids pump 44, to be discharged onshore together with the solids from collection vessel 12.

In a specific embodiment, the collection module is made up of a collection vessel 12 having a total capacity of 126 gallons and a solids pump 44, capable of a 50 foot discharge head, is a diaphragm type pump used to evacuate the solids from the collection and treatment vessels 12 and 80. The selective pumping from either vessel is accomplished by the hand operated ball valves 46 and 100. A centrifugal solids pump (not shown) can be used for pumping solids through a long conduit 110 if on shore discharge is desirable. Solids pump 44 is capable of pumping solids with a spherical diameter up to the mesh size of gross solids filter 16, for example, $\frac{3}{4}$ inch.

The collection vessel 12 can be visualized as being divided into five volumes. The bottom 25 to 50% by volume of the vessel 12 provides for solids storage. Directly above the solids storage volume is a filter volume comprising 10–15% of the vessel volume provided by disposing the filters 22 and 24 in the lower half of the vessel 12. A process volume comprising 5–10% of the vessel volume is disposed directly above the filter volume, and a surge and storage volume is disposed directly above the process volume and comprises about 25 to 50% of the vessel volume. A ullage volume disposed above the collection vessel 12 inlet comprises about 5 to 10% of the total vessel volume.

The solids storage is designed to collect particles larger than the filters will pass (i.e., 200 microns and larger). These particles will eventually settle in the storage volume while smaller sized particles remain in suspension in the upper volumes where they will pass through the filters and be pumped to the treatment vessel 40. The process pumps 28 and 30 alternate approximately once every 90 seconds to insure adequately backwashed filters 22 and 24. The designed process volume has a predetermined capacity to assure that each of the filters will be backwashed at least once during the pumping of the entire process volume. The ullage volume allows a high level alarm float switch (not shown) to activate, and will provide a limited inflow time for correction of a malfunction after the high level alarm has sounded.

The static mixer 72 is a length of pipe containing a series of zig-zag positioned plates that are positioned so as to repeatedly split the fluid stream thereby producing turbulent flow to assure intermixing of the sewage, coagulant chemical and, in a preferred embodiment, disinfectant. The static mixer 72 is designed to permit a center baffle plate section 73 to be withdrawn and cleaned. As the sewage enters the mixer, two injection nozzles (not shown) force a measured amount of coagulant and disinfectant chemical into the sewage. These injection nozzles open well above the processing pressure to assure a consistent quantity and even flow of chemicals into the sewage stream.

Figure 6:
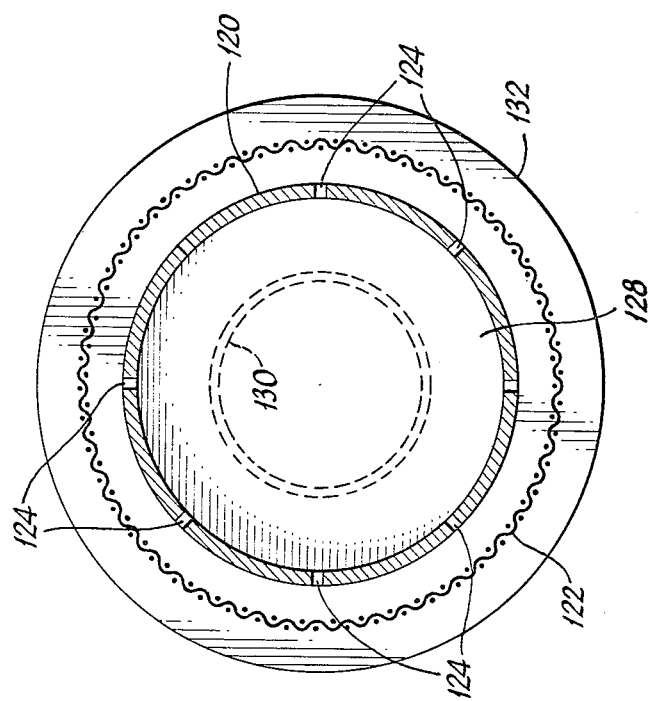
FIG. 6 is a cross sectional view of the filter of FIG. 5 taken across the lines 5-6 of FIG. 5.
Figure 5:
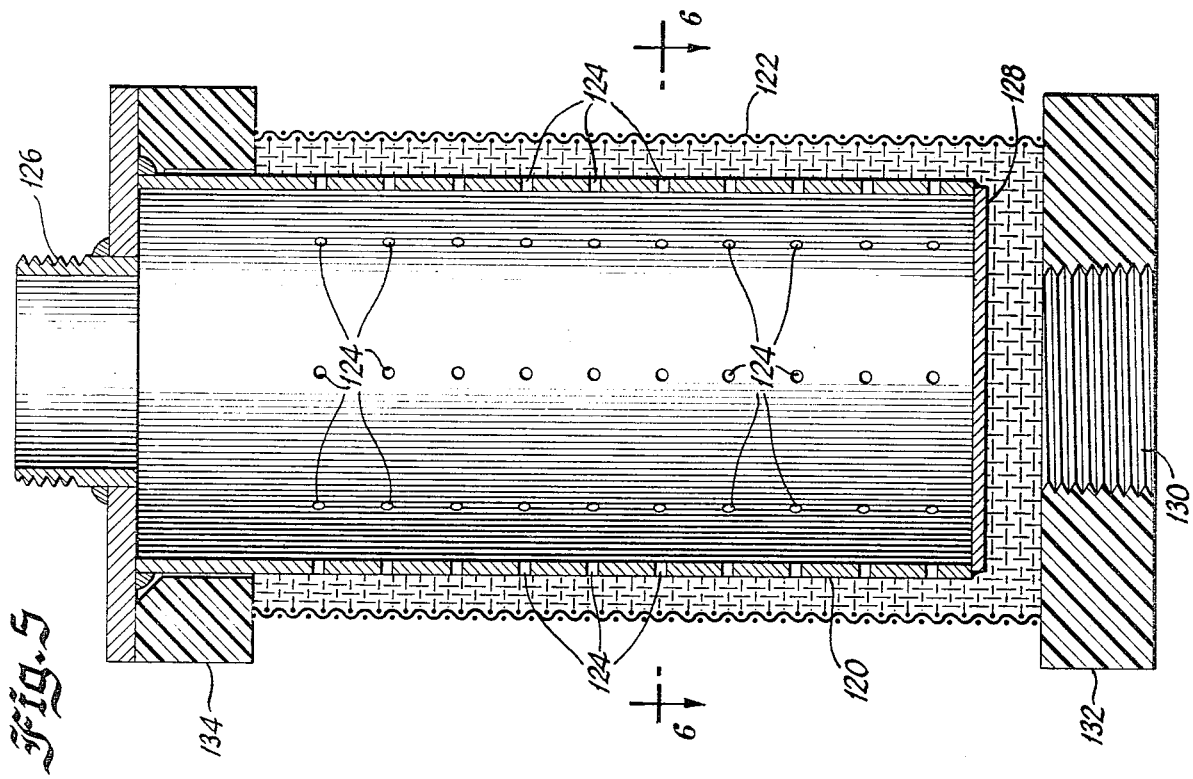
FIG. 5 is a partially elevated cross sectional view of a preferred filter for use in the collection vessel constructed in accordance with the principles of the present invention.

Referring now to FIGS. 5 and 6, in accordance with a important feature of one embodiment of the present invention, filters 22 and 24 are constructed to include, an inner, closed end elongated annular conduit or flow passage 120 surrounded by a screen or wire mesh 122. The inner flow conduit 120 includes a plurality of small waste water exit apertures 124, for example 3/32 inch in diameter, for passage of filtered waste water containing relatively small solid sewage particles. The small exit holes 124, numbering about 80 in a specific embodiment, providing a total of less than about one square inch of exit area, create sufficient velocity to the filtered waste water to remove solids build-up from the outer screen 122 adjacent each hole 124. The backwash process is particularly effective when operated at a velocity of at least about 100 feet per minute through holes 124, and preferrably greater than about 300 feet per minute. As a specific example, 10 gallons per minute is backwashed through the filters. The ratio of backflush flow to process flow through the filter shown in FIG. 5 is in the range of about 1.5–2.5/1, and preferably 2/1.

Backwash sewage enters the filter at inlet conduit 126 and passes rapidly through apertures 124 to clean screen 122 in an expanded area adjacent to and larger than each aperture 124. The interior backwash conduit 120 includes a closed end 128. The processed waste water is filtered through outer screen 122 and proceeds through filter exit conduit 130, defined by an aperture in screen support member 132, and out of the collection vessel through conduit 18 or 20 (FIG. 1) The inlet end of the filter also includes a screen support member 134 for maintaining the screen a predetermined distance from the interior backwash conduit 120.

PREFERRED EMBODIMENT

In a specific embodiment, the treatment vessel 40 has a total capacity of 73 gallons. The multi-chamber design provides waste water velocity gradients and retention volumes for the removal and treatment of microorganisms. The tank has three basic dimensional relationships- A center volume within inner chamber 76, surrounded by annular wall 74, provides the primary storage for retained solids. An outer or toroidal volume, between annular wall 74 and the outer walls of the treatment vessel 40, extends the retention time of the waste water within the treatment vessel 40 to provide a high level of water quality. The open area beneath the inner volume 76 permits a controlled flow of the sewage from the inner chamber 76 to the outer chamber 80. The combined result of flocculation and disinfection, or in another embodiment, flocculation and extraneous gas bubble floatation, results in a spongy mass of solids retained inside the inner chamber 76. As the system is used, this retained mass builds downwardly in the inner chamber 76 and should be drained and flushed at a predetermined maintenance interval. The multi-chamber design of the vessel 40 is such that any passage of floatable material into the outer volume 80 cannot be discharged since the overboard discharge suction conduit 82 has its intake holes on its top surface and is situated low enough to allow for a scum layer to form above it without influencing the discharge water quality. The treatment vessel 40 is operated under a standing head of 14 inches of water. The standing head of water insures that separated solids will not remix with the water under vessel roll or pitch. The vessel 40 includes a float switch (not shown) to prevent overboard discharge until the vessel 40 is full.

The homogeneous mixture of sewage, disinfectant and coagulant chemicals is forced through a static mixer 72 where waste water, coagulant, and disinfectant are comingled by creation of turbulent flow within the mixer. The homogeneous fluid then leaves the mixer and enters the center portion 76 of the treatment vessel 40 where it is sprayed toward the inner cylinder walls 74. As the vessel 40 fills, the air in the inner volume 76 of the tank is displaced by the entering fluid, and the air in the toroidal volume 80 is vented via check valve 112 into the inner volume 76, which is inter-connected to the collection vessel 12 and exterior vents 92 and 94 by return line 90. This return line 90 serves a dual purpose by carrying a small liquid return to collection vessel 12 as well as serving as a vent.

As an example of the operation of the method and apparatus of the present invention, for a 750 gallon per day stream, the 24 hour average inflow is 0.52 gallons/min. Since documented studies indicate that peak shipboard flows (3×the 24 hour average inflow) occur four times daily and each peak lasts approximately 90 minutes or less, the process and discharge rate and the surge and storage volumes are based upon these data. The discharge rate is set at 1.3 GPM (2.5 times the daily inflow) which permits the sewage to accumulate at 0.5 GPM in the surge and storage volume (40 to 50 gallons) during peak periods. The process flow volume is controlled by an orifice at 1.6 GPM. This overflow insures a full treatment tank under a positive collection vessel 12. The slight overflow (0.3 GPM) is carried back to the collection vessel 12. This overflow may carry flocculated and disinfected material back to the collection vessel 12, where it has no detrimental effect upon the incoming waste water and provides some degree of pretreatment.

The disinfectant pump 62 injects a solution of sodium hypochlorite, calcium hypochlorite, or other waste water disinfectant into the sewage stream at the rate of, for example, 200 milligrams/liter (200 parts/million). While gaseous chlorine can be used as a disinfectant, it is too great a potential hazard to be used on shipboard.

Flocculation to increase particle size of suspended solids is necessary since a significant fraction of the particle in the sewage stream are quite small. Tests of sewage indicate that over 16% of the solid particles are one micron or less in size. These colloidal particles are at a stable state, i.e., they are suspended in the fluid and resist aggregation. Introducing a polyelectrolyte along with suitable velocity gradients, caused by turbulent flow and then flow gradients through the treatment vessel 40, will cause flocculation, or particle growth, to occur in three steps. The static mixer 72 is the primary step in flocculation or coagulation by thoroughly mixing the coagulant with the sewage without excessive shearing action. The second step is the dispersal of the incoming liquid into the inner volume 76 of the treatment vessel 40. In this volume 76, the major portion of the aggregation or coagulation takes place. The third step in clarification takes place in the outer volume 80 which affords a more quiescent environment for the final flocculation to occur before overboard discharge. It is in this chamber 80 that dissolved solids, e.g. phosphorous, are removed.

The highly cationic polyelectrolytes were shown the most efficient. Percol 774 ®, is one of a number of eligible chemicals found to be quite effective as a coagulant. A liquid coagulant was chosen over a powder since it is much more easily prepared from a stock (as received) to a feed solution. Other effective coagulants include all coagulants known to coagulant sewage wastes, such as those set forth in U.S. Pat. No. 3,445,187, such as: a hompolymer comprising polyacrylic acid or salts or polyacrylic acid, or a copolymer, or terpolymer or higher multi-component polymer wherein at least 80% of the polymer structure is made up of acrylic acid or acrylic acid salt groups. The polyacrylate salt may be either an alkali metal, alkaline earth metal or ammonium salt.

Besides the homopolymers of polyacrylic acid or polyacrylate salts, another preferred species is a water-soluble copolymer derived from copolymerization of a monomer mixture containing 80-99% by weight of acrylic acid or acrylate salt, and most preferably, alkali metal acrylate salt and 1-20% by weight of an additional and different monomer comprising an ethylenically unsaturated polymerizable compound containing a hydrophilic group in a side chain attached to the unsaturated hydrocarbon structure.

Particularly useful homopolymers or copolymers of the type described above should have a molecular weight in excess of 50,000, and more preferably in excess of 100,000. Excellent additive polymer have molecular weights even as high as ten million.

A wide variety of one or more different monomers may be copolymerized or terpolymerized in amounts up to about 20% with acrylic acid or salts thereof. Typical comonomers include acrylamide, methacrylamide, acrylonitrile, the lower alkyl esters of acrylic and methacrylic acids, vinyl methyl ether, methacrylic acid salts, maleic anhydride and salts thereof, isopropanyl acetate, itaconic acid, vinyl acetate, alpha-methyl styrene, styrene, fumaric acid, aconitic acid, citraconic acid, amides of any of the foregoing acids, alkali metal derivatives (e.g. sodium potassium and lithium), alkaline earth metal derivatives (e.g., magnesium, calcium, barium and strontium), and ammonium salts of any of the above monomeric acids or others, the partial alkyl ester amides and salts of various polycarboxylic acids, vinyl toluene, chlorostyrene, vinyl chloride, vinyl formate, ethylene, propylene, isobutylene.

The coagulation and disinfection systems combine to cause both suspended and dissolved solids to form in a spongy mass within the center 76 and at the top of the outer volume 80 of the treatment vessel 40. Three mixing velocities are used to cause clarification and disinfection. The sewage and chemicals are combined in the static mixer 72 under turbulent flow. The mixture then enters the center volume 76 of treatment vessel 40 where the velocity drops abruptly. The chlorine provides an oxidant which acts upon the sewage combining with the carboneceous material to form, among other products, carbon dioxide which provides buoyancy to the solids. These solid particles are accumulated by the coagulant to form the retained spongy sludge. The partially clarified flow continues downward in the center volume 76 and passes through the open (transition volume) area defined by the bottom portion of vessel 40 below the lowermost edge of wall 74. The open ended cylinder wall 74 acts as an inverted weir to keep the larger, first flocculated solids within the center volume 76. The velocity drops again in the outer volume 80 where the flow is turned upwardly. In the outer volume 80, the smaller suspended particles flocculate and a larger portion of the dissolved solids (nutrients) are removed. Evidence that the smaller sized particles are removed in the final clarification state from volume 80 can be seen in the increased density (or compaction) of the sludge removed from volume 80, as shown in Table I:

TABLE I

| | SOLIDS ANALYSIS | |
| --- | --- | --- |
| | OUTER VOLUME | INNER VOLUME |
| pH | 5.37 | 4.99 |
| Total Solids | 17.3% | 9.40% |
| Ammonia Nitrogen | 2.73% | 3.02% |
| Total Nitrogen | 3.54% | 3.85% |
| Phosphorus | 8.28% | 4.16% |
| B.O.D. | 2340 mg/l | 1750 mg/l |
| Free chlorine | .01 mg/l | .01 mg/l |
| Settleable Solids | 97.5% | 80% |

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A method of treating waste water comprising:
   collecting waste waters including solid and liquid wastes in a first vessel;
   separating a portion of the relatively large solid particles having a predetermined minimum particle size from said waste waters;
   removing a portion of said liquid waste from said first vessel;
   adding a solids coagulant, effective in coagulating solid particles, and a chlorine containing disinfectant to said removed waste;
   conveying at least a portion of said removed waste to a second vessel comprising a multicompartment vessel having a plurality of interconnected chambers including a first chamber and a second chamber and further including the steps of introducing said waste water, said coagulant, and said disinfectant into said first chamber to cause a major portion of the solids contained within said waste water to be coagulated and bubbled to an upper portion of said first chamber, and introducing additional waste water onto said layer of coagulated solid particles accumulated in the upper portion of said first chamber to filter said waste water through said coagulated solids within said first chamber of said second vessel and circulating said waste water into said second chamber for further coagulation and disinfection where the velocity of waste water flow is lowered from said first chamber to said second chamber, wherein a minor portion of the solids contained within said waste water floats to an upper portion of said second chamber thereby providing a purer water in said second chamber than in said first chamber of said multicompartmental vessel; and removing the treated waste water from said second chamber.

2. A method as defined in claim 1 wherein said coagulant and said disinfectant are added to said waste water at a point prior to the addition of said waste water to said second vessel to form a waste water-coagulant-disinfectant mixture to allow sufficient contact time of said mixture prior to entering said second vessel to achieve coagulation of solid particles and liberation of gas bubbles immediately upon introducing said mixture into said second vessel.

3. A method as defined in claim 1 wherein said coagulant is effective in coagulating colloidally sized particles suspended in said liquid waste.

4. A method as defined in claim 1 further including the step of contacting the treated waste water with an absorbant effective in absorbing dissolved organic material from said treated waste water.

5. A method as defined in claim 4 wherein said absorbant comprises activated charcoal.

6. A method as defined in claim 1 further including the step of mixing said waste water, said coagulant, and said disinfectant to form a uniform mixture by conveying a mixture of waste water, coagulant, and disinfectant through means for creating turbulent fluid flow.

7. A method as defined in claim 6 wherein said waste water, coagulant and disinfectant are subjected to turbulent flow prior to conveying said mixture to said second vessel.

8. A method as defined in claim 1 wherein said relatively large solid particles are removed from said waste waters by conveying said waste waters through filters disposed within said first vessel.

9. A method as defined in claim 1 wherein said first chamber of said multicompartmental second vessel is an inner chamber and wherein said second chamber of said multicompartmental second vessel is an outer chamber so that said waste water is conveyed to said inner chamber of said second vessel and circulated to said outer chamber of said second vessel.

10. A method of treating waste water comprising:
collecting waste waters including solid and liquid wastes in a first vessel;
separating a portion of the relatively large solid particles having a predetermined minimum particle size from said waste waters;
removing a portion of said liquid waste from said first vessel;
adding a solids coagulant, effective in coagulating solid particles, and a chlorine containing disinfectant to said removed waste;
conveying at least a portion of said removed waste to a second vessel comprising a multicompartment vessel having a plurality of interconnected chambers including a first chamber and a second chamber said first chamber being in fluid communication with said second chamber substantially only below said first chamber and further including the steps of introducing said waste water, said coagulant, and said disinfectant into an upper portion of said first chamber in a continuous manner to cause said waste water, coagulant, and disinfectant to flow through said first chamber, under said first chamber and into said second chamber, and to cause a major portion of the solids contained within said waste water to be coagulated and bubbled to an upper portion of said first chamber, and circulating said waste water into said second chamber for further coagulation and disinfection where the velocity of waste water flow is lowered from said first chamber to said second chamber, wherein a minor portion of the solids contained within said waste water floats to an upper portion of said second chamber thereby providing a purer water in said second chamber than in said first chamber of said multicompartmental vessel; and
removing the treated waste water from said second chamber.

11. A method as defined in claim 10 further including removing said waste water from an upper portion of said second chamber.

12. A method of treating waste water comprising:
collecting waste waters including solid and liquid wastes in a first vessel;
separating a portion of the relatively large solid particles having a predetermined minimum particle size from said waste waters;
removing a portion of said liquid waste from said first vessel;
adding a solids coagulant, effective in coagulating solid particles, and a disinfectant to said removed waste;
conveying at least a portion of said removed waste to a second vessel comprising a multicompartmental vessel having a plurality of interconnected chambers including a first chamber and a second chamber and further including the steps of introducing said waste water, said coagulant, and said disinfectant into said first chamber to cause a major portion of the solids contained within said waste water to be coagulated and bubbled to an upper portion of said first chamber, and introducing additional waste water onto said layer of coagulated solid particles accumulated in the upper portion of said first chamber to filter said waste water through said coagulated solids within said first chamber of said second vessel and circulating said waste water into said second chamber for further coagulation and disinfection where the velocity of waste water flow is lowered from said first chamber to said second chamber wherein a minor portion of the solids contained within said waste water floats to an upper portion of said second chamber thereby providing a purer water in said second chamber than in said first chamber of said multicompartmental vessel;
injecting gas bubbles into said vessel to cause a major portion of said coagulated solids to rise in said first chamber of said second vessel and a minor portion of said coagulated solids to rise in said second chamber of said second vessel; and
removing the treated waste water from said second chamber.

* * * * *